May 15, 1928.
J. J. HERLBAUER
1,670,259
ELECTRICAL CONDUIT FITTING
Filed Sept. 28, 1926
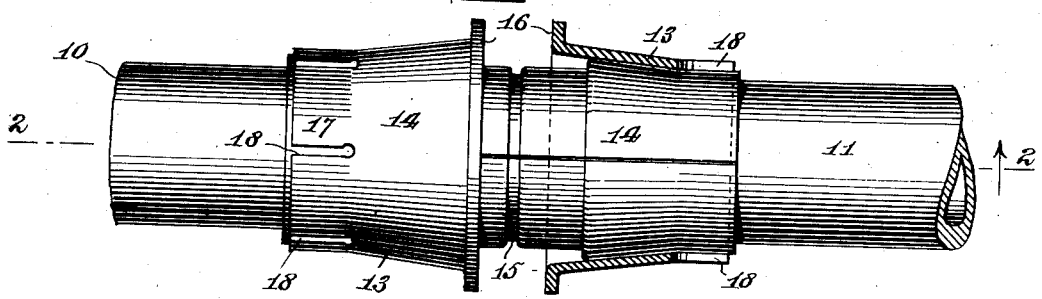
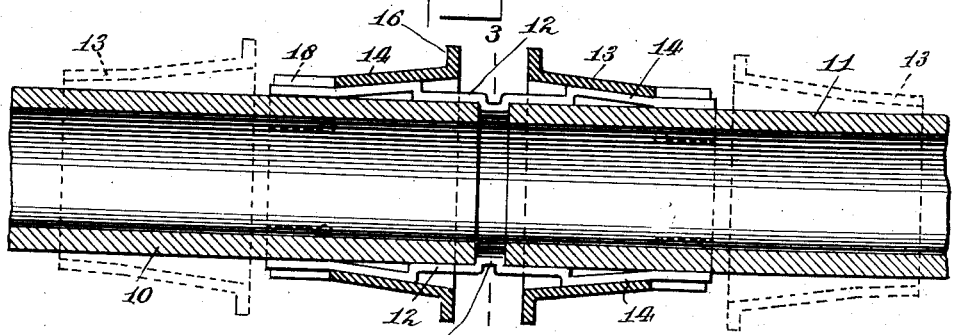
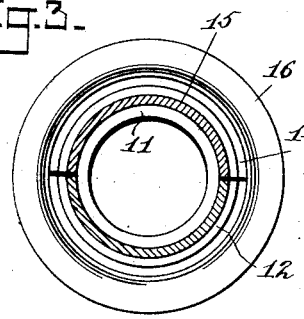
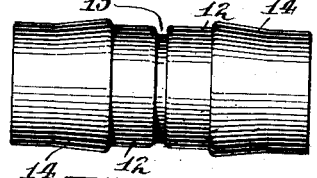
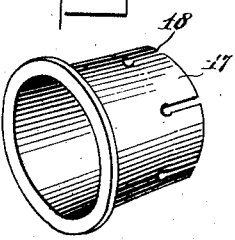
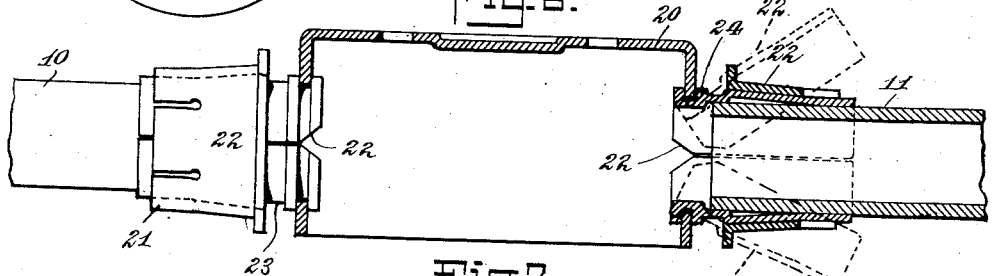
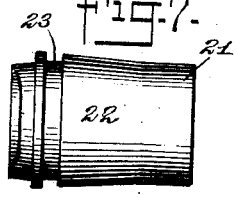
WITNESSES
William P. Goebel
Franklin J. Foster
INVENTOR
Joseph J. Herlbauer
BY
Munn & Co.
ATTORNEYS Patented May 15, 1928.

1,670,259

UNITED STATES PATENT OFFICE.

JOSEPH J. HERLBAUER, OF NEW YORK, N. Y.

ELECTRICAL CONDUIT FITTING.

Application filed September 28, 1926. Serial No. 138,311.

The present invention relates to improvements in electrical conduit fittings of the type commonly employed for securing electrical conduits to outlet boxes, switch boxes or the like, or for coupling a pair of conduits.

The fitting is primarily designed as an improvement over the fitting set forth in my copending application Serial No. 84,943, filed January 30th, 1926.

It will be recalled that in the former fitting, split bushings defined a socket for the conduit end, and the bushings were retained in cooperating relationship by clamping nuts screwed over their tapered ends. In accordance with the present invention, the use of screw threads is entirely eliminated, and spring metal sleeves are substituted. The parts of the fitting instead of requiring to be machined, are all capable of production by a stamping operation with consequent material reduction in the cost of manufacture of the parts.

Another object of the invention is to provide a fitting having no threaded connection with the conduit, and in which the conduit end need not be threaded, yet so constructed that the conduit is securely gripped and coupled to an outlet box or its equivalent.

A more specific object of the invention is to provide a conduit fitting peculiarly adapted for use with outlet boxes and so constructed that the fitting is accessible at all times from the outside of the box and may be consequently applied or removed with facility even though the box is located in an awkward or inaccessible position.

A further object of the invention is to provide a unique type of coupling having no threaded connection with the conduits which it couples, yet capable of ready application and removal and adapted for effecting a strong and secure coupling.

Further objects of the invention are to provide fittings of the general character above noted, designed for use with standard types of conduits and electrical equipment; fittings which when used in connection with an outlet box permit the use of the full box space for wires or cables; and fittings which will be of simple, practical construction, and which will be rugged and durable in use.

With the above noted and other objects in view, the invention consists in certain novel features of construction and combinations and arrangements of parts, as will be more fully hereinafter set forth and pointed out in the claim. The invention may be more fully understood from the following description in connection with the accompanying drawings, wherein—

Fig. 1 is a view mainly in side elevation showing a pair of conduits coupled by one of the improved fittings, one of the sleeves being shown in section for the sake of clearness.

Fig. 2 is a longitudinal sectional view on the line 2—2 of Fig. 3, the dotted lines indicating the positions of the sleeves after they have been slipped over the conduits and before they are forced home.

Fig. 3 is a transverse sectional view on the line 3—3 of Fig. 2.

Fig. 4 is a view on a reduced scale showing one of the semi-cylindrical sections of the coupling in side elevation.

Fig. 5 is a view on a reduced scale showing one of the sleeves in perspective.

Fig. 6 is a view partly in section and partly in elevation through an outlet box showing a pair of conduits coupled to the box by the use of fittings, one of the latter being shown in section and the other in elevation.

Fig. 7 is a side elevational view of one of the socket sections shown in Fig. 6.

Figs. 1 to 4 of the drawings disclose a type of fitting adapted to be used for coupling the aligned ends of a pair of conduits 10 and 11. The coupling includes a pair of approximately semi-cylindrical members 12 which embrace the ends of the conduits and are retained in cooperative relationship by sleeves 13.

Each member 12 is tapered as at 14 adjacent its ends, and the sleeves 13 are similarly tapered so that when they are shifted from the dotted line to the full line position of Fig. 2, they will wedge over the tapered portions of the members 12 and secure the latter firmly in position. Each member 12 is formed with an approximately semi-annular inwardly presented rib 15, these ribs cooperatively defining shoulders against which the ends of the conduits 10 and 11 abut.

It is to be noted that the larger ends of the sleeves 13 are formed with external flanges or equivalent projections 16, and that the smaller ends of the sleeves are in the nature of approximately cylindrical apron portions 17 inwardly slitted from their edges as at 18 to define a series of similar spring tongues between the slots.

To effect coupling of the two conduits, they are arranged in end to end relationship. The two semi-cylindrical coupling members 12 are applied with the ribs 15 entering in between the ends of the conduits. Sleeves 13 are then slipped over the ends of the conduits 10 and 11 and forced home by the use of a suitable tool so that the tapered portions ride over the tapered portions of the members 12. The tongues defined by the slots 18 permit expansion of the apron portion 17 of the sleeves, so that when the sleeves have been forced fully home, a strong circumferential spring gripping action will be exerted on the members 12, and there will be no danger of the members 13 accidentally working their way out of position.

In this connection it is to be noted that the electrical fittings are never subjected to any material strain after they have been once applied, and it is merely essential that the sleeves fit tightly enough, so that they will not become loosened by ordinary vibrations. It will be noted that both the members 12 and the sleeves 13 have been shown as stamped from metal stock; both the aprons, tapered portions and flanges of the sleeves, as well as the entire bodies of the semi-cylindrical members 12 being of the same gauge metal.

In Figs. 6 and 7 I have shown the use of a special type of coupling for securing the conduits 10 and 11 to an outlet box 20.

In this instance, I provide a pair of semi-cylindrical portions 21 cut away as at 22 to cooperatively define diametrically opposed V-shaped notches at one end when the two members are assembled. The notched ends of the coupling members are exteriorly semi-annularly grooved at 23, so that they may be conveniently hooked into engagement with the slots of an outlet box opening as best seen in Fig. 6. The presence of the notches 22 permits the members 21 to be hooked as indicated in dotted lines in Fig. 6, so that the members may be conveniently rocked into engagement with the outlet box, or out of engagement with one of the conduits, and at the same time are interlocked with the outlet box against axial movement when in final position.

The bodies of the members 21 are tapered as indicated at 22 for coaction with the sleeves 13.

It will be noted that the grooves 23 in the bushing members 21 are of somewhat greater width than the thickness of the material of the outlet box, so that when the bushing sections are hooked or coupled to the outlet box, they may hinge on the walls of the opening therein and be readily relatively separated either about diametrically opposed points of the walls of the inlet openings as pivots, or about the tongues of the cut away portions 22 as fulcrums.

The bushing sections 21 may also be provided with internal shoulders 24 serving as abutments for the ends of the conduits.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claim.

I claim:

An electrical conduit fitting comprising a coupling including a pair of semi-cylindrical members cooperatively defining a split socket for one end of a conduit, said members being externally tapered, an internally tapered sleeve adapted to fit over the socket members and be wedged thereon, said sleeve being resiliently radially expansible adjacent its smaller end, whereby to exert a spring gripping action on the socket members as the sleeve is forced home, said sleeve having a series of longitudinal slots extending inwardly from its smaller end and defining an annular series of spring tongues.

JOSEPH J. HERLBAUER.